(12) United States Patent
Abushawashi et al.

(10) Patent No.: US 10,864,944 B2
(45) Date of Patent: Dec. 15, 2020

(54) VEHICLE FRAME

(71) Applicant: Ford Global Technologies, LLC, Dearborn, MI (US)

(72) Inventors: Yalla Mussa Abushawashi, Canton, MI (US); Marwan Ahmad Elbkaily, Canton, MI (US); Muhsin M. Hamdoon, Windsor (CA); Benjamin Mansfield, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 15/979,047

(22) Filed: May 14, 2018

(65) Prior Publication Data

US 2019/0344829 A1     Nov. 14, 2019

(51) Int. Cl.
*B62D 21/03* (2006.01)
*B62D 21/15* (2006.01)

(52) U.S. Cl.
CPC .......... *B62D 21/157* (2013.01); *B62D 21/03* (2013.01)

(58) Field of Classification Search
CPC ...... B62D 21/03; B62D 21/15; B62D 21/152; B62D 21/155; B62D 21/157
See application file for complete search history.

(56) References Cited

U.S. PATENT DOCUMENTS

| | | | |
|---|---|---|---|
| 5,823,287 A | 10/1998 | Chidamparam et al. | |
| 6,695,393 B1 * | 2/2004 | Aouadi | B62D 21/152 296/187.09 |
| 6,758,516 B1 | 7/2004 | Abramczyk et al. | |
| 6,962,390 B1 | 11/2005 | Myers et al. | |
| 7,488,017 B2 | 2/2009 | Lassl et al. | |
| 7,537,273 B2 | 5/2009 | Lassl et al. | |
| 8,807,597 B2 * | 8/2014 | Akaki | B62D 21/02 180/232 |
| 8,882,150 B2 * | 11/2014 | Yamada | B62D 21/02 280/784 |
| 10,214,243 B2 * | 2/2019 | Elbkaily | B62D 21/02 |
| 2002/0170766 A1 | 11/2002 | Gantz et al. | |
| 2012/0319336 A1 * | 12/2012 | Yamada | B60G 7/02 267/141 |
| 2013/0140850 A1 * | 6/2013 | Tyan | B62D 21/15 296/187.03 |
| 2013/0241239 A1 * | 9/2013 | Mori | B62D 25/04 296/193.06 |
| 2016/0332672 A1 * | 11/2016 | Hamdoon | B62D 21/157 |
| 2017/0355331 A1 * | 12/2017 | Ciklakarsli | B62D 21/152 |

(Continued)

FOREIGN PATENT DOCUMENTS

| CN | 101269671 1 A | 9/2008 |
|---|---|---|
| DE | 102004012500 A1 | 10/2005 |

(Continued)

*Primary Examiner* — Barry Gooden, Jr.
(74) *Attorney, Agent, or Firm* — Ray Coppiellie; Bejin Bieneman PLC

(57) ABSTRACT

A vehicle frame includes a first frame rail and a second frame rail elongated along a vehicle-longitudinal axis and spaced from each other along a cross-vehicle axis. The vehicle frame includes a cross-beam elongated along the cross-vehicle axis between the first frame rail and the second frame rail. The cross-beam includes a first groove and a second groove both proximate the first frame rail and spaced from each other along the cross-vehicle axis.

18 Claims, 8 Drawing Sheets

(56) References Cited

U.S. PATENT DOCUMENTS

| | | | |
|---|---|---|---|
| 2018/0037075 A1* | 2/2018 | Chang | B60D 1/565 |
| 2018/0201320 A1* | 7/2018 | Knittel | B62D 27/023 |
| 2018/0244318 A1* | 8/2018 | Kiyoshita | B62D 21/157 |
| 2019/0009824 A1* | 1/2019 | Watanabe | B62D 25/025 |
| 2019/0016387 A1* | 1/2019 | Elbkaily | B62D 21/02 |
| 2019/0217902 A1* | 7/2019 | Viaux | C22C 38/32 |
| 2019/0283809 A1* | 9/2019 | Kondo | B62D 25/2036 |
| 2019/0375461 A1* | 12/2019 | Kirtland | B62D 23/005 |
| 2020/0031399 A1* | 1/2020 | Matsuda | B62D 25/20 |

FOREIGN PATENT DOCUMENTS

| | | |
|---|---|---|
| EP | 2487090 A2 | 8/2012 |
| KR | 100242767 B1 | 3/2000 |

\* cited by examiner

VEHICLE FRAME

BACKGROUND

During a vehicle impact, such as a vehicle side impact, a body and/or a frame of a vehicle may deform and intrude on a passenger cabin of the vehicle. Such intrusion may be measured during a crash worthiness test, e.g., a test conducted in accordance with FMVSS No. 214. It may be beneficial to design the vehicle, e.g., the frame of the vehicle, to limit such intrusion.

DETAILED DESCRIPTION

Figure 1:
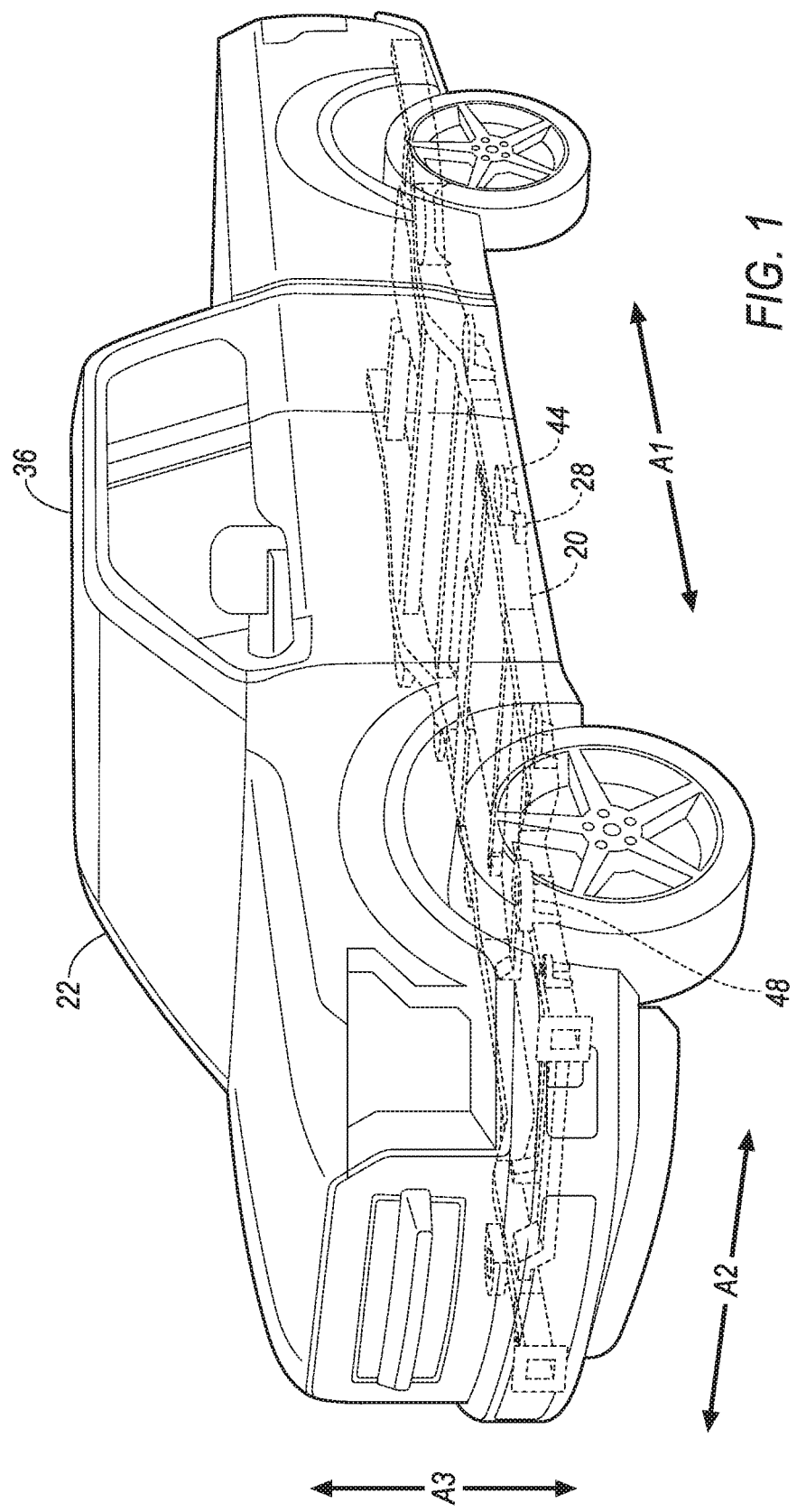
FIG. 1 is a perspective view of a vehicle having a frame.

A vehicle frame includes a first frame rail and a second frame rail elongated along a vehicle-longitudinal axis and spaced from each other along a cross-vehicle axis. The vehicle frame includes a cross-beam elongated along the cross-vehicle axis between the first frame rail and the second frame rail. The cross-beam includes a first groove and a second groove both proximate the first frame rail and spaced from each other along the cross-vehicle axis.

The first groove may be elongated along the vehicle-longitudinal axis.

The second groove may be elongated along a vehicle-vertical axis.

The cross-beam may include an intermediate portion, the first groove and the second groove may be between the intermediate portion and the first frame rail, and a flexural strength of the cross-beam at the first groove may be less than a flexural strength of the cross-beam at the intermediate portion.

The cross-beam may include a third groove and a fourth groove both proximate the second frame rail and spaced from each other along the cross-vehicle axis.

A flexural strength of the cross-beam at each of the first groove, the second groove, the third groove and the fourth groove may be less than a flexural strength of an intermediate portion of the cross-beam between the first groove and the second groove, and the third groove and the fourth groove.

The cross-beam may include a top surface and a rear surface, the first groove located on the top surface and the second groove located on the rear surface.

The vehicle frame may include a body mount extending from the first frame rail away from the second frame rail by a first distance. The cross-beam may extend from the first frame rail away from the second frame rail along the cross-vehicle axis by a second distance that is at least half as much as the first distance.

The cross-beam may extend from the first frame rail away from the second frame rail along the cross-vehicle axis by at least 30 millimeters.

The cross-beam may be monolithic.

The cross-beam may be free of support brackets.

A vehicle includes a first frame rail and a second frame rail elongated along a vehicle-longitudinal axis and spaced from each other along a cross-vehicle axis. The vehicle includes a shock tower bracket fixed relative to the first frame rail. The vehicle includes a cross-beam extending from the first frame rail to the second frame rail at a vehicle-rearward position relative to the shock tower bracket. The cross-beam includes a first groove and a second groove both proximate the first frame rail and spaced from each other along the cross-vehicle axis.

The vehicle may include a seat supported by the first frame rail directly above the cross-beam.

The vehicle may include a body mount extending from the first frame rail, and wherein the cross-beam extends from the first frame rail along the cross-vehicle axis away from the second frame rail such that the cross-beam is impacted before the body mount during a NHTSA rigid pole side impact test.

The cross-beam may include a third groove and a fourth groove both proximate the second frame rail and spaced from each other along the cross-vehicle axis.

The cross-beam at each the first groove, the second groove, the third groove and the fourth groove may have a flexural strength that is less than a flexural strength of an intermediate portion of the cross-beam between the first groove and the second groove, and the third groove and the fourth groove.

The cross-beam may include a top surface and a rear surface, the first groove may be located on the top surface and the second groove may be located on the rear surface.

The vehicle may include a body mount extending from the first frame rail away from the second frame rail along the cross-vehicle axis by a first distance. The cross-beam may extend from the first frame rail away from the second frame rail along the cross-vehicle axis by a second distance that is at least half as much as the first distance.

The cross-beam may extend from the first frame rail away from the second frame rail along the cross-vehicle axis by at least 30 millimeters.

The cross-beam may be monolithic.

With reference to the Figures, wherein like numerals indicate like parts throughout the several views, a frame 20 for a vehicle 22 includes a first frame rail 24 and a second frame rail 26 elongated along a vehicle-longitudinal axis A1 and spaced from each other along a cross-vehicle axis A2. The frame 20 includes a cross-beam 28 elongated along the cross-vehicle axis A2 between the first frame rail 24 and the second frame rail 26, the cross-beam 28 including a first groove 30 and a second groove 32 both proximate the first frame rail 24 and spaced from each other along the cross-vehicle axis A2. The numerical adjectives "first," "second," etc., are used merely as identifiers, and are not intended to indicate order or relative importance.

The frame 20 is designed to deform in a controlled manner to restrict an amount of intrusion into a passenger cabin 34 of the vehicle 22, e.g., during a vehicle side impact. For example, during the vehicle side impact, the first groove 30 and the second groove 32 may induce buckling of the cross-beam 28 proximate the first frame rail 24. Proximate the first frame rail 24 means closer to the first frame rail 24 than to the second frame rail 26, e.g., between the first frame rail 24 and a longitudinally extending centerline CL of the vehicle. As an example of proximate, the first groove 30 and the second groove 32 may induce buckling in the quarter of the cross-beam 28 closest to the first frame rail 24. Similarly, the cross-beam 28 may include a third groove 58 and a fourth groove 60 proximate the second frame rail 26. The third groove 58 and fourth groove 60 induce bucking of the cross-beam 28 proximate the second frame rail 26, e.g., in the quarter of the cross-beam 28 closest to the second frame rail 26.

The vehicle 22 may be any passenger or commercial automobile such as a car, a truck, a sport utility vehicle, a crossover vehicle, a van, a minivan, a taxi, a bus, etc.

The vehicle 22 defines the vehicle-longitudinal axis A1, i.e., extending between a front and a rear of the vehicle 22. The vehicle 22 defines the cross-vehicle axis A2, i.e., extending between a left side and a right side of the vehicle 22. The vehicle 22 defines a vehicle-vertical axis A3, i.e., extending between a top and a bottom of the vehicle 22. The vehicle-longitudinal axis A1, the cross-vehicle axis A2, and the vehicle-vertical axis A3 may be perpendicular to each other. The vehicle 22 defines the longitudinally extending centerline CL, e.g., extending along the vehicle-longitudinal axis A1 and midway between the right side and the left side of the vehicle. The front, rear, top, bottom, left side, and right side may be relative to an orientation of an operator of the vehicle 22. The front, rear, top, bottom, left side, and right side may be relative to an orientation of controls for operating the vehicle 22, e.g., an instrument panel, etc. The front, rear, top, bottom, left side, and right side may be relative to a forward driving direction when wheels of the vehicle 22 are all parallel with each other.

Figure 2:
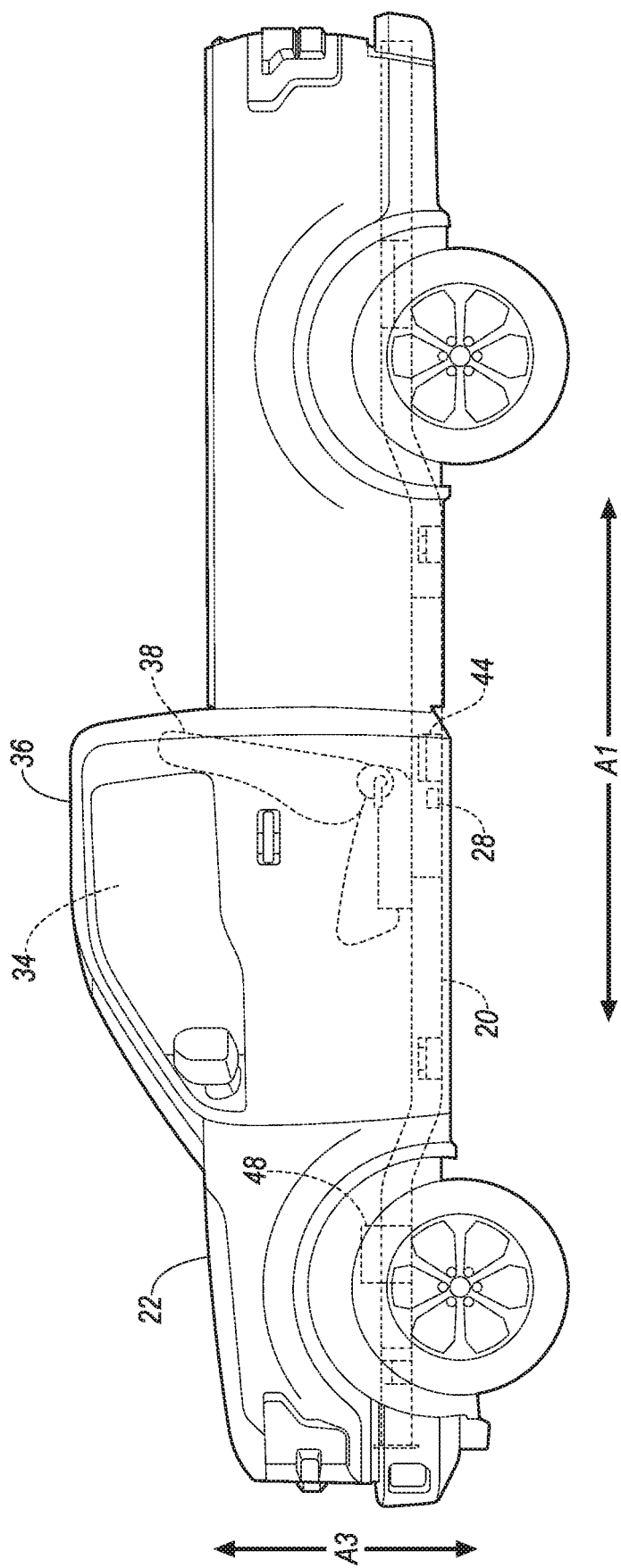
FIG. 2 is a side view of the vehicle having the frame.
Figure 3:
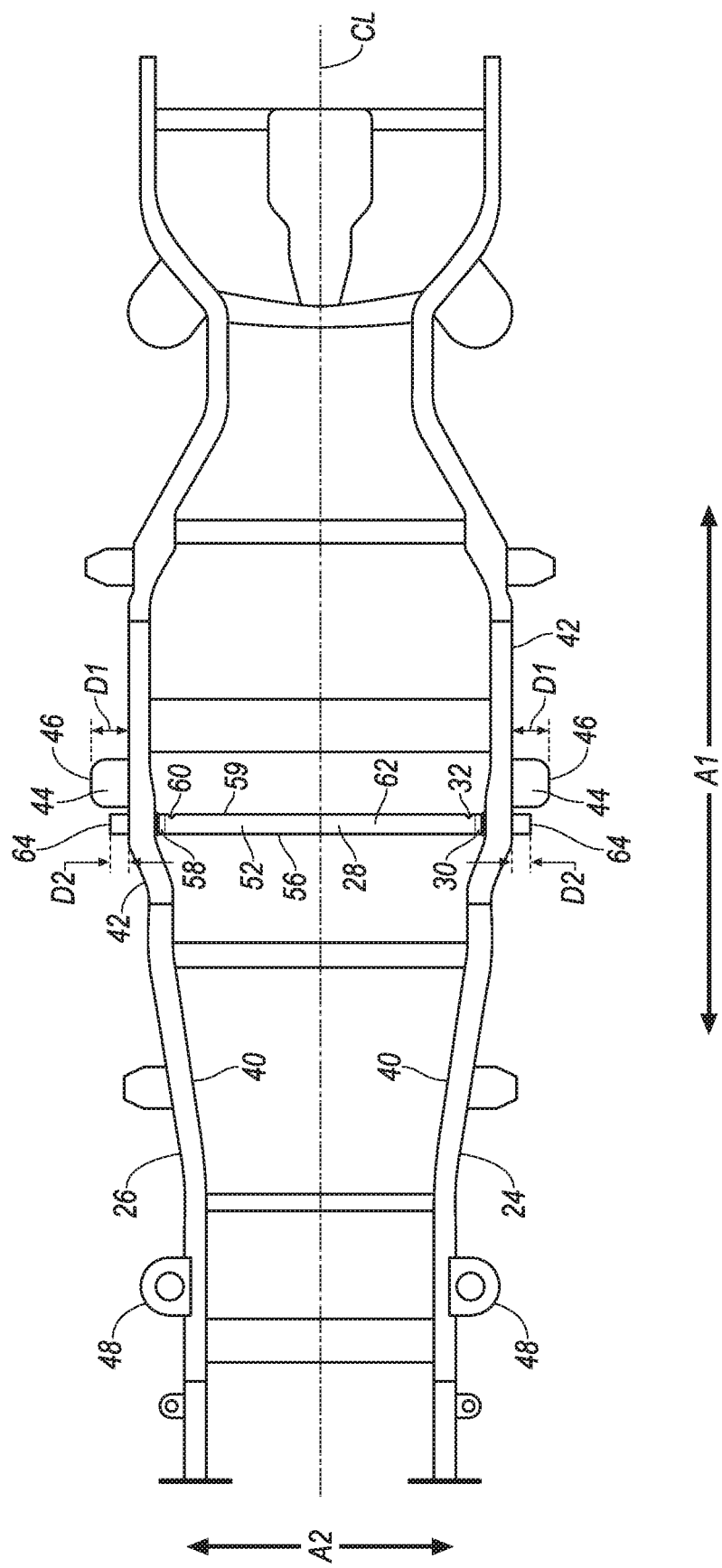
FIG. 3 is a top view of the frame.
Figure 4:
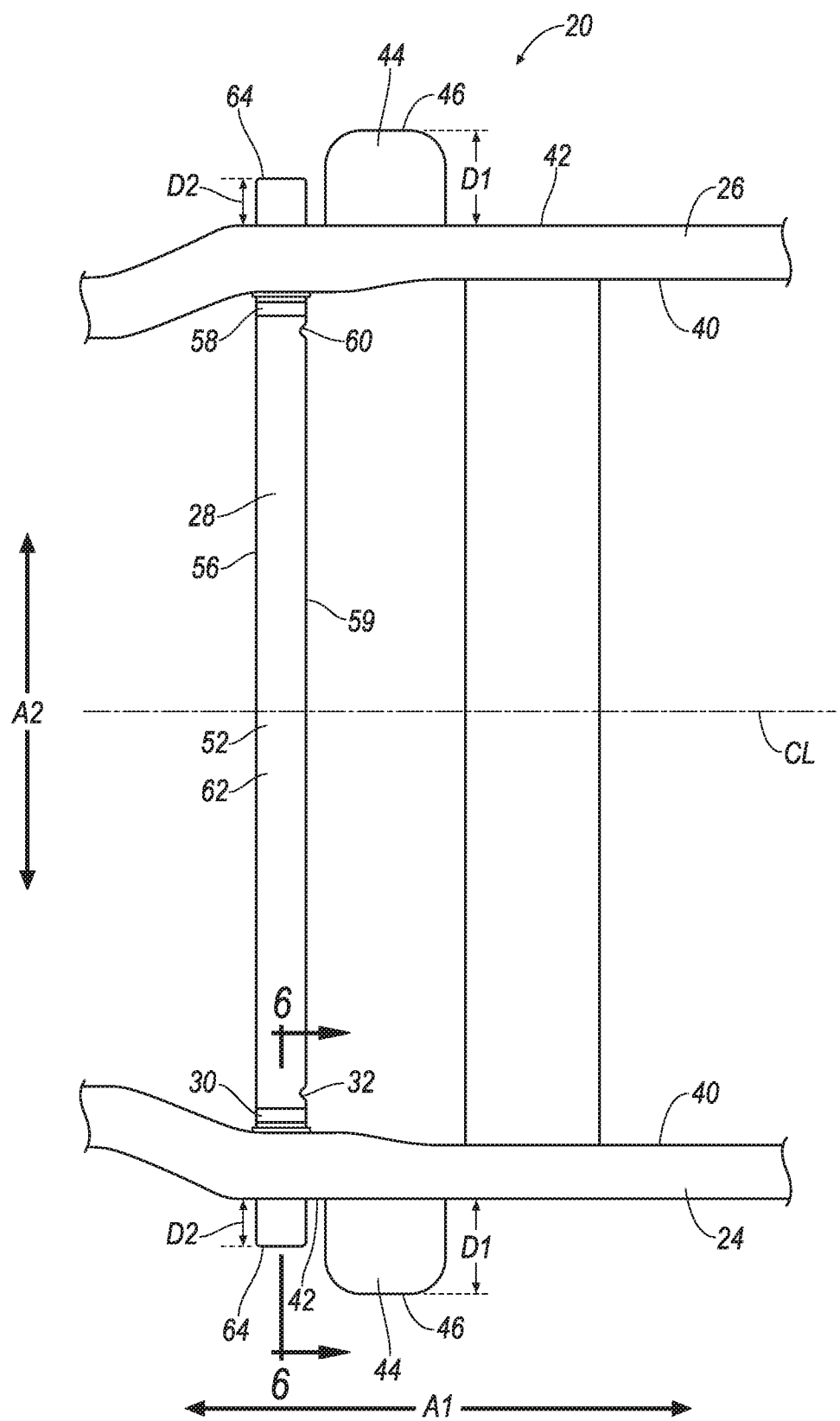
FIG. 4 is a top view of a portion of the frame.
Figure 5:
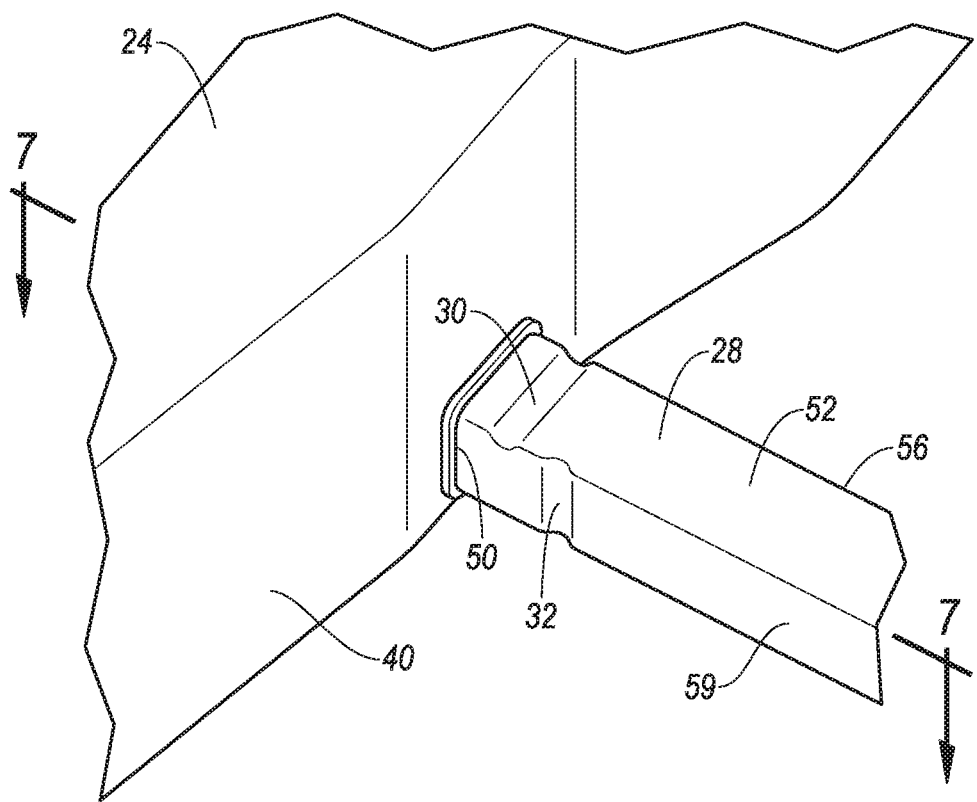
FIG. 5 is a perspective view of a portion of the frame.
Figure 6:
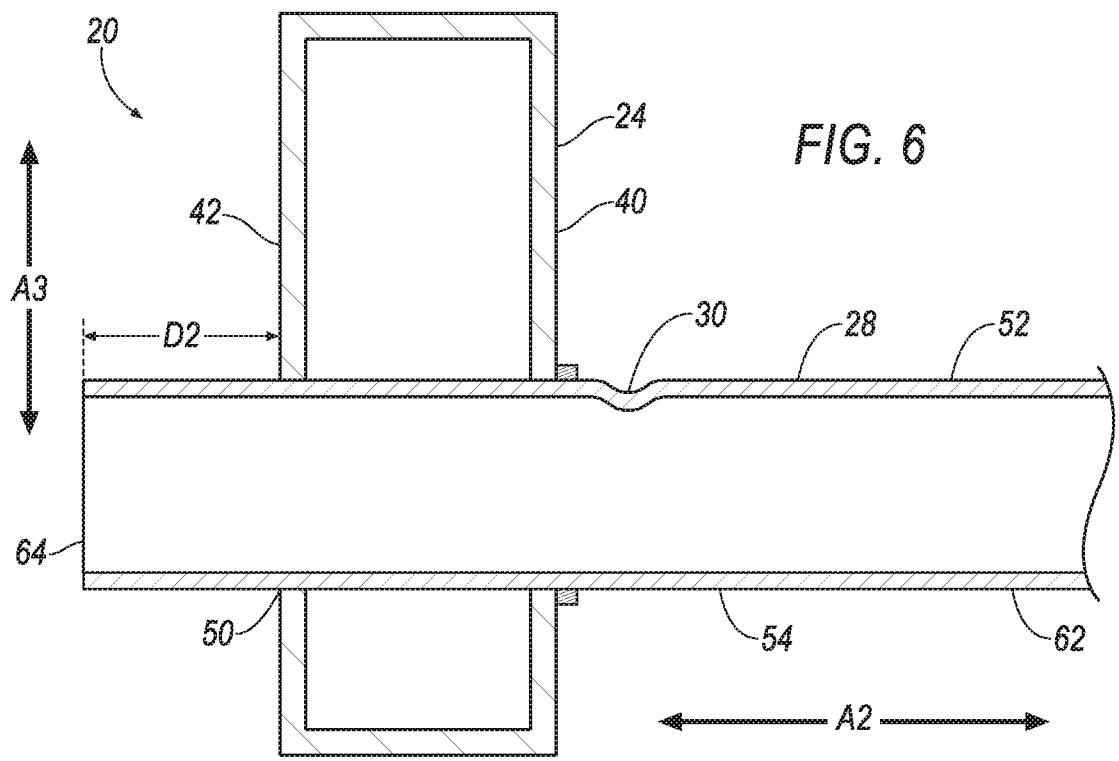
FIG. 6 is a front cross section of a portion of the frame.
Figure 7:
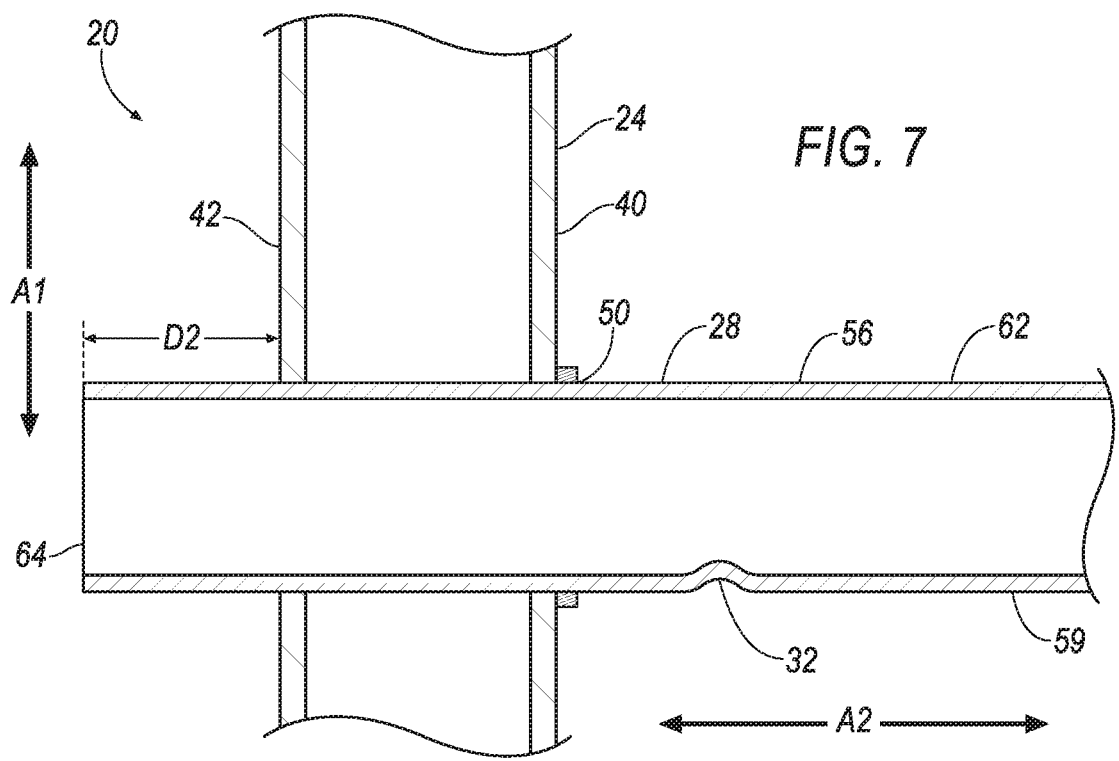
FIG. 7 is a top cross section of a portion of the frame.
Figure 8:
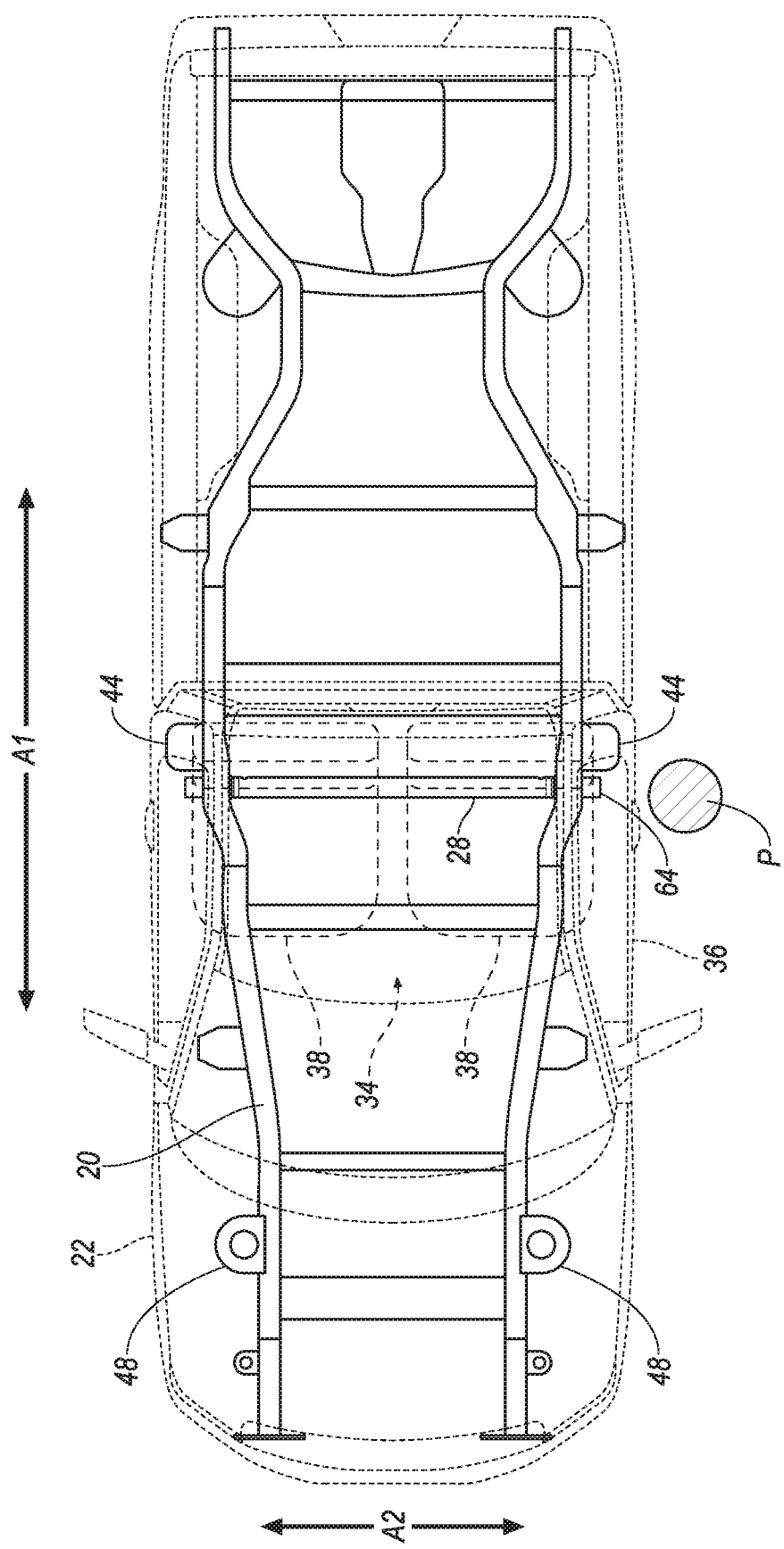
FIG. 8 is a top view of the vehicle having the frame and a post for a side impact test.
Figure 9:
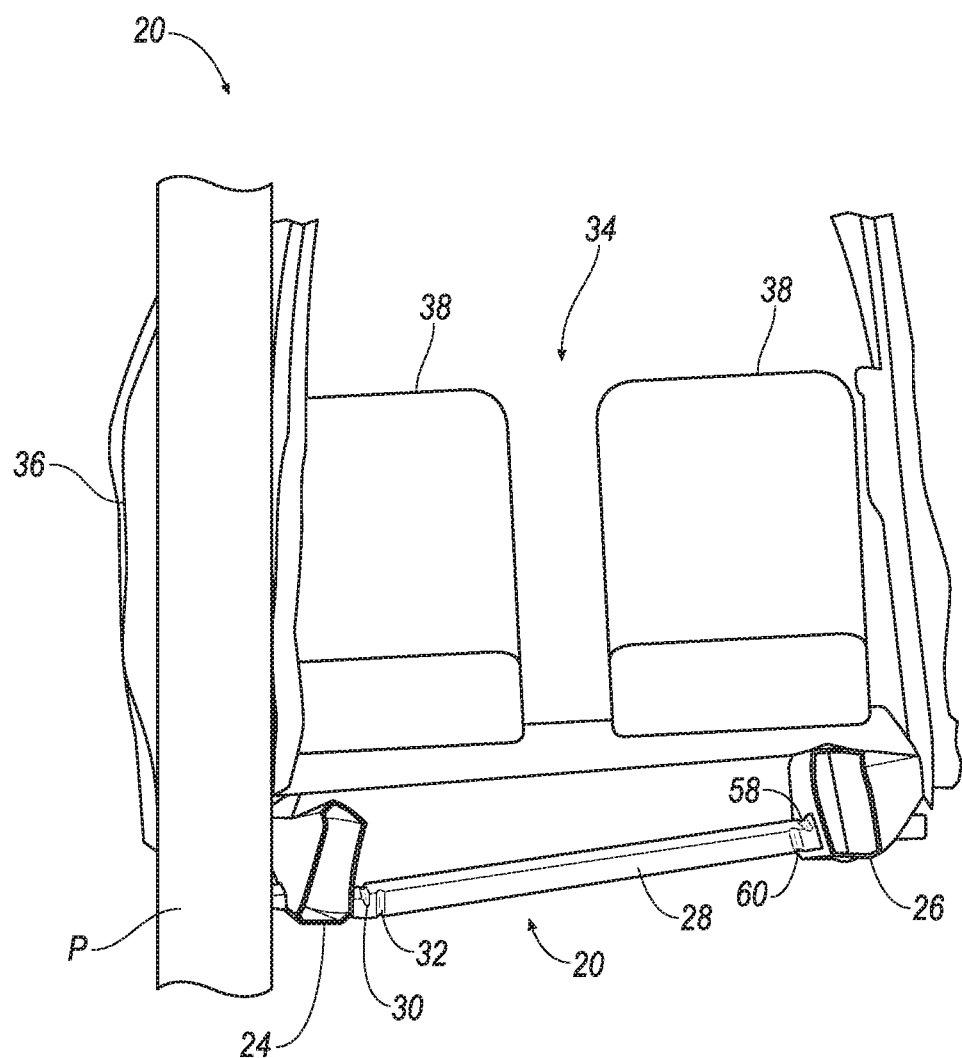
FIG. 9 is a cross section of the vehicle having the frame and the post during the side impact test.

The vehicle 22 includes a body 36. The body 36 encloses the passenger cabin 34 to house occupants, if any, of the vehicle 22. The passenger cabin 34 includes one or more seats 38. In FIGS. 2, 8, and 9, the seat 38 is shown to be a bucket seat, but the seats 38 may be other types. The position and orientation of the seats 38 and components thereof may be adjustable by an occupant. One or more of the seats 38 may be supported by the first frame rail 24 directly above the cross-beam 28, as shown in FIG. 2. In other words, one or more of the seats 38 may be spaced from the cross-beam 28 along the vehicle-vertical axis A3 and aligned with the cross-beam 28 along the cross-vehicle axis A2, e.g., one or more of the seats 38 and the cross-beam 28 may be a same distance from the front of the vehicle 22. In such configuration, the cross-beam 28 restricts deformation of the body 36 of the vehicle 22 along the cross-vehicle axis A2 at the seat 38, e.g. during a vehicle side impact.

The first frame rail 24 and the second frame rail 26 may support other vehicle components, e.g., the body 36, the seats 38, an engine, etc. The first frame rail 24 and the second frame rail 26 are elongated along the vehicle-longitudinal axis A1. For example, the first frame rail 24 and the second frame rail 26 may extend from the front of the vehicle 22 to the rear of the vehicle 22. The first frame rail 24 and the second frame rail 26 are spaced from each other along the cross-vehicle axis A2. The first frame rail 24 and the second frame rail 26 may include inward facing surfaces 40 that face each other. The first frame rail 24 and second frame rail 26 may include outward facing surfaces 42 that face away from each other. The first frame rail 24 and the second frame rail 26 may be metal or any suitable material.

The frame 20 may include one or more body mounts 44, shown in FIGS. 1-4 and 8. The body mounts 44 connect the first frame rail 24 and/or the second frame rail 26 to the body 36, e.g., some of the body mounts 44 may connect the first frame rail 24 to the body 36, and others of the body mounts 44 may connect the second frame rail 26 to the body 36. The body mounts 44 extend from the first frame rail 24 and/or the second frame rail 26. For example, one or more body mounts 44 may extend from the first frame rail 24 and away from the second frame rail 26. As another example one or more body mounts 44 may extend from the second frame rail 26 and away from the first frame rail 24. In other words, the body mounts 44 may extend outwardly from the outward facing surfaces 42 of the first frame rail 24 and/or the second frame rail 26, e.g., away from the longitudinally extending centerline CL of the vehicle 22. The body mounts 44 may be metal or any suitable material. The body mounts 44 may be fixed to the first frame rail 24 and/or the second frame rail 26, e.g., via fastener, welding, etc. As another example, the body mounts 44 and the first frame rail 24 and/or the second frame rail 26 may be monolithic.

One or more body mounts 44 may extend from the first frame rail 24 and/or the second frame rail 26 by a first distance D1. For example, the first distance D1 may be from the outward facing surface 42 of the first frame rail 24 or the second frame rail 26 to a distal end 46 of the body mount 44. The first distance D1 may be measured along the cross-vehicle axis A2.

The vehicle 22 may include one or more shock tower brackets 48, shown in FIGS. 1-3 and 8. The shock tower brackets 48 connect the frame 20, e.g., the first frame rail 24 and/or the second frame rail 26, to a suspension system of the vehicle 22. For example, the shock tower brackets 48 may connect to a dampener and coil-over spring shock absorber. The shock tower brackets 48 may be fixed relative to the first frame rail 24 and/or the second frame rail 26. For example, one or more shock tower brackets 48 may extend from the first frame rail 24. As another example one or more shock tower brackets 48 may extend from the second frame rail 26. The shock tower brackets 48 may be metal or any suitable material. The shock tower brackets 48 may be fixed to the first frame rail 24 and/or the second frame rail 26, e.g., via fastener, welding, etc. As another example, the shock tower brackets 48 and the first frame rail 24 and/or the second frame rail 26 may be monolithic.

The cross-beam 28 is elongated along the cross-vehicle axis A2 between the first frame rail 24 and the second frame rail 26. The cross-beam 28 may be fixed to the first frame rail 24 and/or the second frame rail 26, e.g., via fastener, welding, etc. The cross-beam 28 may extend outwardly along the cross-vehicle axis A2 from midway between the first frame rail 24 and the second frame rail 26, e.g., from the longitudinally extending centerline CL, to beyond the first frame rail 24 and/or the second frame rail 26. For example, the first frame rail 24 and the second frame rail 26 may each include an opening 50. The cross-beam 28 may extend through the opening 50. In other words, the cross-beam 28 extends through the first frame rail 24 and the second frame rail 26. The cross-beam 28 may be fixed to the first frame rail 24 and/or the second frame rail 26 at the opening 50, e.g., via fastener, welding, etc.

The cross-beam 28 extends from the first frame rail 24 to the second frame rail 26 at a vehicle-rearward position relative to the shock tower bracket 48. In other words, the cross-beam 28 is behind the shock tower bracket 48 along the vehicle-longitudinal axis A1. Having the cross-beam 28 behind the shock tower bracket 48 may reduce intrusion into the passenger cabin 34, e.g., during a vehicle side impact.

The cross-beam 28 may be hollow. The cross-beam 28 may be rectangular in cross-section taken perpendicular to the cross-vehicle axis A2, or any other suitable shape. The cross-beam 28 may include outer surfaces such as a top surface 52, a bottom surface 54, a front surface 56, and a rear surface 59, e.g., relative to the vehicle-vertical axis A3 and the vehicle-longitudinal axis A1. The cross-beam 28 may be steel or any suitable material.

The cross-beam 28 includes the first groove 30 and the second groove 32. The cross-beam 28 may include the third groove 58. The cross-beam 28 may include the fourth groove 60. The grooves 28, 30, 58, 60 induce local buckling, and reduce local crumpling, of the cross-beam 28 when sufficient compressive force is applied, e.g., during a vehicle side impact.

The first groove 30 and the second groove 32 are both proximate the first frame rail 24. In other words, the first groove 30 and the second groove 32 are closer to the first frame rail 24 than to the second frame rail 26, e.g., along the cross-vehicle axis A2. The first groove 30 and the second groove 32 may be closer to the first frame rail 24 than to the longitudinally extending centerline CL. The first groove 30 and the second groove 32 are spaced from each other along the cross-vehicle axis A2. For example, the first groove 30 may be closer to the first frame rail 24 than the second groove 32 is to the first frame rail 24 or the first groove 30 may be further from the first frame rail 24 than the second groove 32 is to the first frame rail 24. The third groove 58 and the fourth groove 60 may both be proximate the second frame rail 26, e.g., along the cross-vehicle axis A2. The third groove 58 and the fourth groove 60 may be closer to the second frame rail 26 than to the longitudinally extending centerline CL. The third groove 58 and the fourth groove 60 may be spaced from each other along the cross-vehicle axis A2.

The first groove 30 may be elongated along the vehicle-longitudinal axis A1. For example, the first groove 30 may be located on the top surface 52 of the cross-beam 28 and extend between the front surface 56 and the rear surface 59. As another example, the first groove 30 may be located on the bottom surface 54 of the cross-beam 28 and extend between the front surface 56 and the rear surface 59 (not shown). Similarly, the third groove 58 may be elongated along the vehicle-longitudinal axis A1.

The second groove 32 may be elongated along the vehicle-vertical axis A3. For example, the second groove 32 may be located on the rear surface 59 of the cross-beam 28 and extend between the top surface 52 and the bottom surface 54. As another example, the second groove 32 may be located on the front surface 56 of the cross-beam 28 and extend between the top surface 52 and the bottom surface 54 (not shown). Similarly, the fourth groove 60 may be elongated along the vehicle-vertical axis A3.

The cross-beam 28 may be free of grooves opposite the first groove 30, the second groove 32, the third groove 58 and/or the fourth groove 60. For example, when the first groove 30 is on the top surface 52, the bottom surface 54 opposite the top surface 52 at the first groove 30, e.g., along the vehicle-vertical axis A3, may be free of grooves. As another example, when the second groove 32 is on the rear surface 59, the front surface 56 opposite the rear surface 59 at the second groove 32, e.g., along the vehicle-longitudinal axis A1, may be free of grooves. Having the cross-beam 28 free of grooves opposite the first groove 30, the second groove 32, the third groove 58 and/or the fourth groove 60 causes deformation of the cross-beam 28 at the first groove 30, the second groove 32, the third groove 58 and/or the fourth groove 60 prior to deformation of the cross-beam 28 opposite the grooves 30, 32, 58, 60, e.g., during a vehicle side impact, causing the cross-beam 28 to buckle.

The cross-beam 28 may include an intermediate portion 62. The intermediate portion 62 may be between the first groove 30 and the second groove 32, and the third groove 58 and the fourth groove 60. In other words, the first groove 30 and the second groove 32 may be at one end of the intermediate portion 62, and the third groove 58 and the fourth groove 60 may be at an opposite end of the intermediate portion 62. For example, the first groove 30 and the second groove 32 may be between the intermediate portion 62 and the first frame rail 24, and the third groove 58 and the fourth groove 60 may be between the intermediate portion 62 and the second frame rail 26.

The cross-beam 28 may be monolithic, i.e., a single, uniform piece of material with no seams, joints, fasteners, or adhesives holding it together. For example, the cross-beam 28 may be a single piece of rolled or extruded steel which is forged, pressed, machined, etc., into shape. The monolithic cross-beam 28 may provide more predictable deformation characteristics, e.g., as compared to if the cross-beam 28 included two pieces of material fixed together. In the alternative to being monolithic, the cross-beam 28 may be formed of components formed separately and subsequently fixed together.

The cross-beam 28 may free of support brackets. For example, the cross-beam 28 may not include a doubler, i.e., a secondary beam fixed over the cross-beam 28. As another example the cross-beam 28 may not include additional panels or other structures fixed to the cross-beam 28, e.g., via fastener, welding, etc., to provide increased strength. Being free of support brackets helps reduce cost, weight, etc., of the cross-beam 28, e.g., while the grooves 30, 32, 58, 60 provide characteristics to the cross-beam 28 to reduce intrusion into the passenger cabin 34, e.g., during a vehicle side impact.

The cross-beam 28 is designed to induce buckling at the grooves 30, 32, 58, 60. To induce the buckling, a flexural strength of the cross-beam 28 at the first groove 30 is less than a flexural strength of the cross-beam 28 at the intermediate portion 62. For example, a crush strength of the first groove 30 may be lower than a crush strength of the bottom surface 54 opposite the first groove 30, and a crush strength of the top surface 52 and a crush strength of the bottom surface 54 at the intermediate portion 62 may be the same. The lower crush strength may provide increased deformation of the first groove 30 as compared to deformation of the bottom surface 54 opposite the first groove 30, e.g., when the cross-beam 28 is compressed during a vehicle side impact. Such difference in crush strength may induce buckling. The lower crush strength of the first groove 30 may be provided by a smaller thickness of the first groove 30 than of the bottom surface 54 opposite the first groove 30, stress concentration areas at the first groove 30, etc. Similarly, a flexural strength of the cross-beam 28 at each of the second groove 32, the third groove 58 and the fourth groove 60 may be less than the flexural strength of the intermediate portion 62 of the cross-beam 28.

The cross-beam 28 may extend from the first frame rail 24 away from the second frame rail 26 along the cross-vehicle axis A2. The cross-beam 28 may extend from the second frame rail 26 and away from the first frame rail 24 along the cross-vehicle axis A2. To put is another way, the cross-beam 28 may extend outwardly from the first frame rail 24 and/or the second frame rail 26 along the cross-vehicle axis A2.

The cross-beam 28 may extend from the first frame rail 24 and/or the second frame rail 26 by a second distance D2. For example, the second distance D2 may be from the outward facing surface 42 of the first frame rail 24 or the second frame rail 26 to a distal end 64 of the cross-beam 28. The second distance D2 may be measured along the cross-vehicle axis A2.

The second distance D2 aids the cross-beam 28 in limiting an amount of deformation of the body 36 during a vehicle side impact. The second distance D2 may be such that the cross-beam 28 engages a post P, shown in FIGS. 8 and 9, used in a vehicle crash worthiness test before one or more of the body mounts 44 engage the post P. For example, the cross-beam 28 may extend such that the cross-beam 28 is impacted before the body mount 44 during a NHTSA rigid pole side impact test, e.g., during a side impact test conducted according to FMVSS No. 214. The second distance D2 may be such that the cross-beam 28 engages post P after a certain amount of deformation of the body 36, etc. For example, the second distance D2 may be at least half as much as the first distance D1. As another example, the second distance D2 may be at least 30 millimeters.

During a vehicle impact, such as a side impact between the post P and the vehicle 22 in a NHTSA rigid pole side impact test, a compressive force is applied to cross-beam 28. The compressive force may cause relatively higher deformation and induced buckling at the first groove 30, the second groove 32, the third groove 58 and/or the fourth groove 60, as shown in FIG. 9. Buckling at the grooves 30, 32, 58, 60 permits less deformation of the body 36 as compared to buckling of the intermediate portion 62. For example, e.g., a distance between the distal ends 64 of the cross-beam 28 will be greater for a buckle at the groove(s) 54, 56, 58, 60 than a buckle at the intermediate portion 62 for any given buckle angle. As another example, proximity of the groove(s) 54, 56, 58, 60 to the first frame rail 24 or second frame rail 26 may enable the intermediate portion 62 to engage the first frame rail 24 and/or the second frame rail 26 subsequent buckling, e.g., providing further resistance to deformation.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle frame comprising:
   a first frame rail and a second frame rail elongated along a vehicle-longitudinal axis and spaced from each other along a cross-vehicle axis; and
   a cross-beam elongated along the cross-vehicle axis between the first frame rail and the second frame rail, the cross-beam including a first groove and a second groove both proximate the first frame rail and spaced from each other along the cross-vehicle axis, the first groove elongated along the vehicle-longitudinal axis and the second groove elongated along a vehicle-vertical axis.

2. The vehicle frame of claim 1, wherein the cross-beam includes an intermediate portion, the first groove and the second groove are between the intermediate portion and the first frame rail, and a flexural strength of the cross-beam at the first groove is less than a flexural strength of the cross-beam at the intermediate portion.

3. The vehicle frame of claim 1, wherein the cross-beam includes a top surface and a rear surface, the first groove located on the top surface and the second groove located on the rear surface.

4. The vehicle frame of claim 1, further comprising a body mount extending from the first frame rail away from the second frame rail by a first distance, and wherein the cross-beam extends from the first frame rail away from the second frame rail along the cross-vehicle axis by a second distance that is at least half as much as the first distance.

5. The vehicle frame of claim 1, wherein the cross-beam extends from the first frame rail away from the second frame rail along the cross-vehicle axis by at least 30 millimeters.

6. The vehicle frame of claim 1, wherein the cross-beam is monolithic.

7. The vehicle frame of claim 1, wherein the cross-beam is free of support brackets.

8. The vehicle frame of claim 1, wherein the cross-beam includes a third groove and a fourth groove both proximate the second frame rail and spaced from each other along the cross-vehicle axis.

9. The vehicle frame of claim 8, wherein a flexural strength of the cross-beam at each of the first groove, the second groove, the third groove and the fourth groove is less than a flexural strength of an intermediate portion of the cross-beam between the first groove and the second groove, and the third groove and the fourth groove.

10. A vehicle, comprising:
    a first frame rail and a second frame rail elongated along a vehicle-longitudinal axis and spaced from each other along a cross-vehicle axis;
    a shock tower bracket fixed relative to the first frame rail; and
    a cross-beam extending from the first frame rail to the second frame rail at a vehicle-rearward position relative to the shock tower bracket, the cross-beam including a first groove and a second groove both proximate the first frame rail and spaced from each other along the cross-vehicle axis, the first groove elongated along the vehicle-longitudinal axis and the second groove elongated along a vehicle-vertical axis.

11. The vehicle of claim 10, further comprising a seat supported by the first frame rail directly above the cross-beam.

12. The vehicle of claim 10, further comprising a body mount extending from the first frame rail, and wherein the cross-beam extends from the first frame rail along the cross-vehicle axis away from the second frame rail such that the cross-beam is impacted before the body mount during a NHTSA rigid pole side impact test.

13. The vehicle of claim 10, wherein the cross-beam includes a top surface and a rear surface, the first groove located on the top surface and the second groove located on the rear surface.

14. The vehicle of claim 10, further comprising a body mount extending from the first frame rail away from the second frame rail along the cross-vehicle axis by a first distance, and wherein the cross-beam extends from the first frame rail away from the second frame rail along the cross-vehicle axis by a second distance that is at least half as much as the first distance.

15. The vehicle of claim 10, wherein the cross-beam extends from the first frame rail away from the second frame rail along the cross-vehicle axis by at least 30 millimeters.

16. The vehicle of claim 10, wherein the cross-beam is monolithic.

17. The vehicle of claim 10, wherein the cross-beam includes a third groove and a fourth groove both proximate the second frame rail and spaced from each other along the cross-vehicle axis.

18. The vehicle of claim 17, wherein the cross-beam at each the first groove, the second groove, the third groove and the fourth groove has a flexural strength that is less than a flexural strength of an intermediate portion of the cross-beam between the first groove and the second groove, and the third groove and the fourth groove.

* * * * *